US011854584B1

(12) United States Patent
Asif Bashir et al.

(10) Patent No.: US 11,854,584 B1
(45) Date of Patent: Dec. 26, 2023

(54) CURRENT ASSISTED HAMR MAGNETIC WRITER

(71) Applicant: Western Digital Technologies, Inc., San Jose, CA (US)

(72) Inventors: Muhammad Asif Bashir, San Jose, CA (US); Alexander Goncharov, Morgan Hill, CA (US); Takuya Matsumoto, San Jose, CA (US); Petrus Antonius Van Der Heijden, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/876,900

(22) Filed: Jul. 29, 2022

Related U.S. Application Data (60) Provisional application No. 63/227,280, filed on Jul. 29, 2021.

(51) Int. Cl.
*G11B 5/00* (2006.01)
*G11B 5/31* (2006.01)
*G11B 5/60* (2006.01)

(52) U.S. Cl.
CPC .... *G11B 5/6088* (2013.01); *G11B 2005/0021* (2013.01)

(58) Field of Classification Search
CPC ......... G11B 5/3912; G11B 5/23; G11B 5/235; G11B 5/2654; G11B 5/2658; G11B 5/315; G11B 5/3133; G11B 5/3146; G11B 5/6082; G11B 2005/0021; G11B 2005/0018
USPC .......................................... 360/59
See application file for complete search history.

(56) References Cited

U.S. PATENT DOCUMENTS

| | | |
|---|---|---|
| 6,665,136 B2 | 12/2003 | Clinton et al. |
| 7,072,142 B2 | 7/2006 | Lam |
| 7,149,055 B2 | 12/2006 | Clinton et al. |
| 7,173,796 B2 | 2/2007 | Freitag et al. |
| 7,983,002 B2 | 7/2011 | Pust et al. |
| 8,116,031 B2 | 2/2012 | Alex et al. |
| 8,411,390 B2 | 4/2013 | Franca-Neto et al. |
| 8,422,159 B2 | 4/2013 | Gao et al. |
| 8,582,240 B1 | 11/2013 | Chen et al. |

(Continued)

FOREIGN PATENT DOCUMENTS

| | | |
|---|---|---|
| CN | 104835510 B | 11/2017 |
| JP | 2013251042 A | 12/2013 |
| WO | 2015126326 A1 | 8/2015 |

OTHER PUBLICATIONS

Nemoto, et al.; Journal of Applied Physics 105; Ultrahigh-Hc granular media with [Cob/Pt]n multilayer film sputtered under Ar+O2 atmosphere; dated 2009; 3 total pages.

(Continued)

*Primary Examiner* — Nabil Z Hindi
(74) *Attorney, Agent, or Firm* — PATTERSON + SHERIDAN, LLP; Steven H. VerSteeg (57) ABSTRACT

The present disclosure relates to heat-assisted magnetic recording (HAMR) write heads including a waveguide and a main pole having a main pole tip. One or more current paths are provided through the main pole tip. Terminals of the one or more current paths can be coupled to the main pole, a trailing shield, a leading shield, a heat sink layer, a touch pad, a pole diffusion barrier layer, a NTS sensor, or another suitable component of the HAMR write head.

20 Claims, 7 Drawing Sheets

(56) References Cited

U.S. PATENT DOCUMENTS

| | | |
|---|---|---|
| 8,797,684 B1 | 8/2014 | Tran et al. |
| 8,891,341 B1 | 11/2014 | Krichevsky et al. |
| 9,070,397 B1 | 6/2015 | Ito et al. |
| 9,230,571 B1 | 1/2016 | Chen et al. |
| 9,230,573 B1 | 1/2016 | Etoh et al. |
| 9,275,672 B2 | 3/2016 | Shiroishi et al. |
| 9,368,135 B2 | 6/2016 | Gao |
| 9,601,144 B1 | 3/2017 | Mehta et al. |
| 9,626,989 B1 | 4/2017 | Buch et al. |
| 9,799,361 B1 | 10/2017 | Duda et al. |
| 9,881,637 B1 | 1/2018 | Wilson et al. |
| 10,121,497 B1 | 11/2018 | Takahashi et al. |
| 10,186,284 B2 | 1/2019 | Narita et al. |
| 10,236,021 B2 | 3/2019 | Narita et al. |
| 10,276,193 B2 | 4/2019 | Narita et al. |
| 10,311,900 B1 | 6/2019 | Liu et al. |
| 10,325,618 B1 | 6/2019 | Wu et al. |
| 10,366,714 B1 | 7/2019 | Olson et al. |
| 10,643,643 B1 * | 5/2020 | Gao .................... G11B 5/235 |
| 11,600,293 B1 * | 3/2023 | Lam .................... G11B 5/2654 |
| 2008/0117545 A1 | 5/2008 | Batra et al. |
| 2008/0304176 A1 | 12/2008 | Takagishi et al. |
| 2009/0059423 A1 | 3/2009 | Yamada et al. |
| 2009/0310244 A1 | 12/2009 | Shimazawa et al. |
| 2013/0016441 A1 | 1/2013 | Taguchi et al. |
| 2013/0250456 A1 | 9/2013 | Yamada et al. |
| 2014/0139952 A1 | 5/2014 | Takeo et al. |
| 2014/0177100 A1 | 6/2014 | Sugiyama et al. |
| 2016/0027455 A1 | 1/2016 | Kudo et al. |
| 2017/0236537 A1 | 8/2017 | Murakami et al. |
| 2018/0268848 A1 | 9/2018 | Narita et al. |
| 2019/0088274 A1 | 3/2019 | Narita et al. |

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

Seigler, Michael A. et al.; "Integrated Heat Assisted Magnetic Recording Head: Design and Recording Demonstration" Journals & Magazines; IEEE Transactions on Magnetics; vol. 44, Issue 1, Jan. 2008 (6 pages).

* cited by examiner

CURRENT ASSISTED HAMR MAGNETIC WRITER

CROSS-REFERENCE TO RELATED APPLICATIONS

This application claims benefit of U.S. Provisional Patent Application Ser. No. 63/227,280, filed Jul. 29, 2021, which is herein incorporated by reference.

BACKGROUND OF THE DISCLOSURE

Field of the Disclosure

Embodiments of the present disclosure generally relate to a heat-assisted magnetic recording (HAMR) magnetic writing head.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface of the recording medium. As the main pole becomes smaller, the recording field becomes smaller as well, limiting the effectiveness of the magnetic recording write head.

HAMR and microwave assisted magnetic recording (MAMR) are two types of energy-assisted recording technology to improve the recording density of a magnetic recording medium, such as a HDD. In HAMR, a laser source is located next to or near the write element in order to produce heat, such as a laser source exciting a near-field transducer (NFT) to produce heat at a write location of a magnetic recording medium. The heat at the write location reduces an effective coercivity of the magnetic recording medium used to store data and allows writing of the magnetic recording medium at lower magnetic fields emanated from the main pole. Thus, higher recording density of the magnetic recording medium may be achieved by HAMR technology. However, the sector error rate of recording data to a magnetic recording medium utilizing a HAMR write head may still be undesirably high.

Therefore, there is a need in the art for an improved HAMR write head to achieve higher recording density to a magnetic recording medium.

SUMMARY OF THE DISCLOSURE

The present disclosure relates to heat-assisted magnetic recording (HAMR) write heads. In one embodiment, a HAMR write head includes a waveguide and a trailing shield. A main pole is between the waveguide and the trailing shield. The main pole has a main pole tip. A coil is around the main pole. An electrical connection is between the main pole tip and the trailing shield. A first terminal is coupled to the main pole. A second terminal is coupled to the trailing shield. A current path is formed between the first terminal and the second terminal through the trailing shield, the electrical connection, and the main pole.

In another embodiment, a HAMR write head includes a leading shield and a main pole. The main pole has a main pole tip. A waveguide is between the leading shield and the main pole. A coil is around the main pole. An electrical connection is between the main pole tip and the leading shield. A first terminal is coupled to the main pole. A second terminal is coupled to the leading shield. A current path is formed between the first terminal and the second terminal through the leading shield, the electrical connection, and the main pole.

In still another embodiment, a HAMR write head includes a leading shield and a trailing shield. A main pole is between the leading shield and the trailing shield. The main pole has a main pole tip. A waveguide is between the leading shield and the main pole. A coil is around the main pole. A leading gap electrical connection is between the main pole tip and the leading shield. A trailing gap electrical connection is between the main pole tip and the trailing shield. A first terminal coupled to the main pole. A second terminal is coupled to the trailing shield. A third terminal is coupled to the leading shield. A first current path is formed through the trailing gap electrical connection. A second current path is formed through the leading gap electrical connection.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to a heat-assisted magnetic recording (HAMR) write head including a waveguide and a main pole having a main pole tip. One or more current paths are provided through the main pole tip. Terminals of the one or more current paths can be coupled to the main pole, a trailing shield, a leading shield, a heat sink layer, a touch pad, a pole diffusion barrier layer, a NTS sensor, or another suitable component of the HAMR write head. One or more bias current provided to the one or more current paths creates one or more assisting magnetic fields at least partially from a trailing gap electrical connection and/or at least partially from a leading gap electrical connection. A HAMR write head with assisting magnetic field(s) generated by the one or more current paths and with heat generated by the waveguide can write to a magnetic disk or a magnetic medium with reduced errors.

Figure 1:
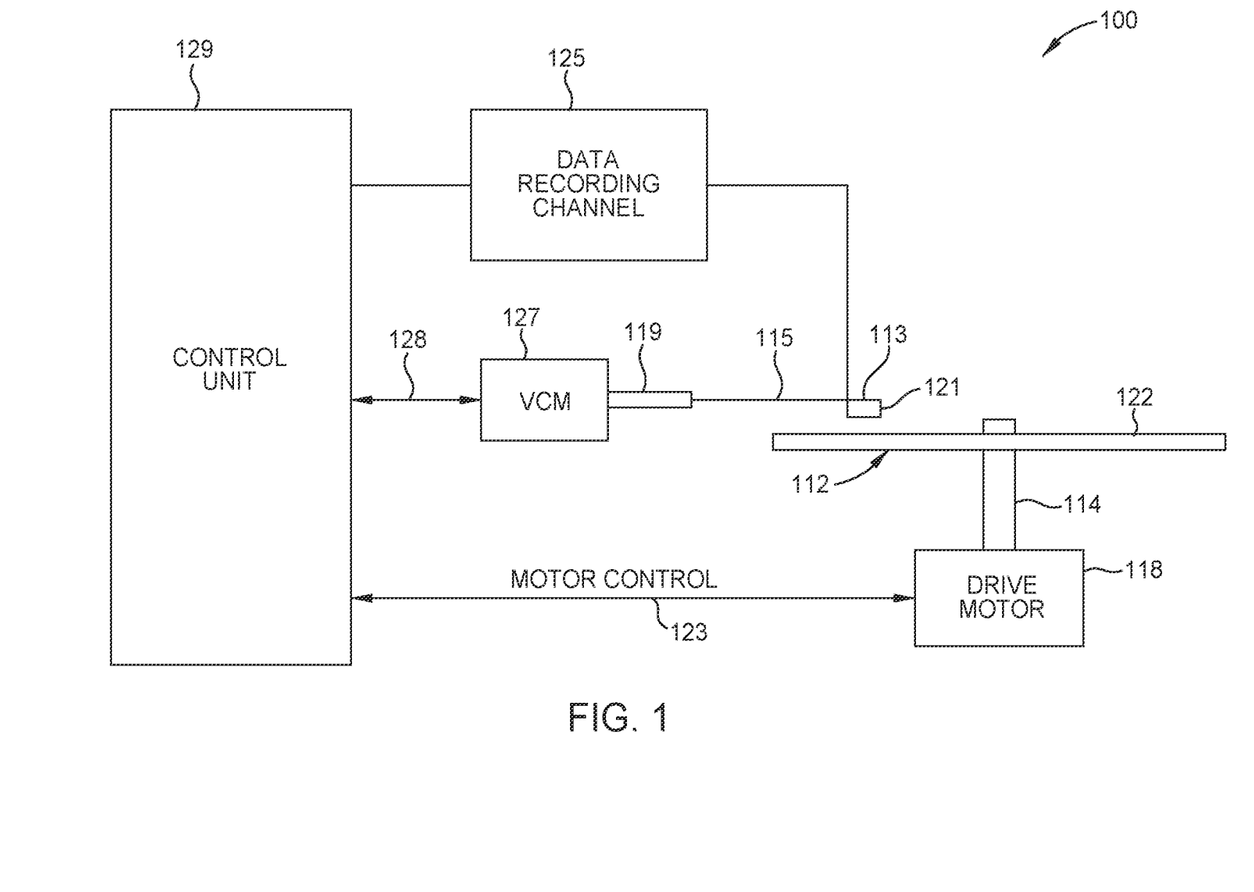
FIG. 1 is a schematic illustration of certain embodiments of a magnetic media drive including a HAMR magnetic write head.

FIG. 1 is a schematic illustration of certain embodiments of a magnetic media drive including a HAMR magnetic write head. Such magnetic media drive may be a single drive/device or comprise multiple drives/devices. For the ease of illustration, a single disk drive 100 is shown according to one embodiment. The disk drive 100 includes at least one rotatable magnetic disk 112 supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more HAMR write heads. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
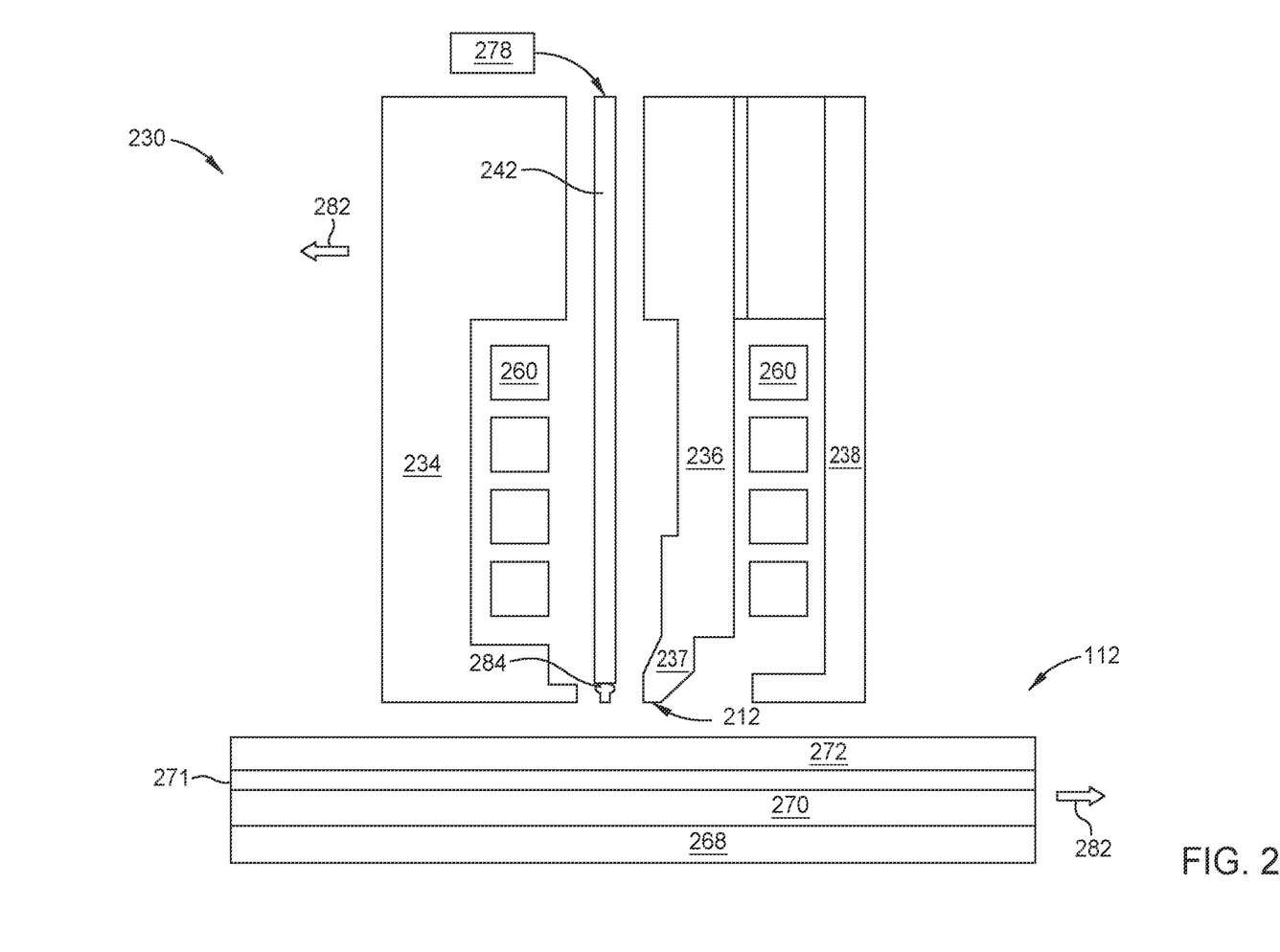
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS) 212, such as an air bearing surface (ABS) or a gas bearing surface (GBS), facing the disk 112. As shown in FIG. 2, the magnetic disk 112 and the HAMR write head 230 relatively moves in the direction indicated by the arrows 282.

The HAMR write head 230 includes a main pole 236 disposed between a leading shield 234 and a trailing shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading shield 234 and/or the trailing shield 238 can act as the return pole for the main pole 236.

The magnetic disk 112 includes a substrate 268, a heat sink layer 270, an interlayer 271, and a magnetic recording layer 272. The magnetic disk 112 is positioned adjacent to or under the HAMR write head 230. A magnetic field produced by current in the coil 260 is used to control the direction of magnetization of bits in the magnetic recording layer 272 of the magnetic disk.

The HAMR write head 230 includes a structure for heating the magnetic disk 112 proximate to where the main pole tip 237 applies the magnetic write field to the storage media. A waveguide 242 is positioned between the main pole 236 and the leading shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the focal point of the waveguide 242. The NFT 284 is positioned in or adjacent to the waveguide 242 near or at the MFS 212. Light from the waveguide 242 is absorbed by the NFT 284 and excites surface plasmons which travel along the outside of the NFT 284 towards the MFS 212 heating a precise area of the NFT 284 which in turn heats a precise area of the magnetic recording layer 272 of the magnetic disk 112. One possible NFT 284 for the HAMR write head is a lollipop design with a disk portion and a peg extending between the disk and the MFS 212. The NFT 284 can be placed in close proximity to the main pole 236. The NFT 284 is relatively thermally isolated and absorbs a significant portion of the laser power while it is in resonance.

Figure 3A:
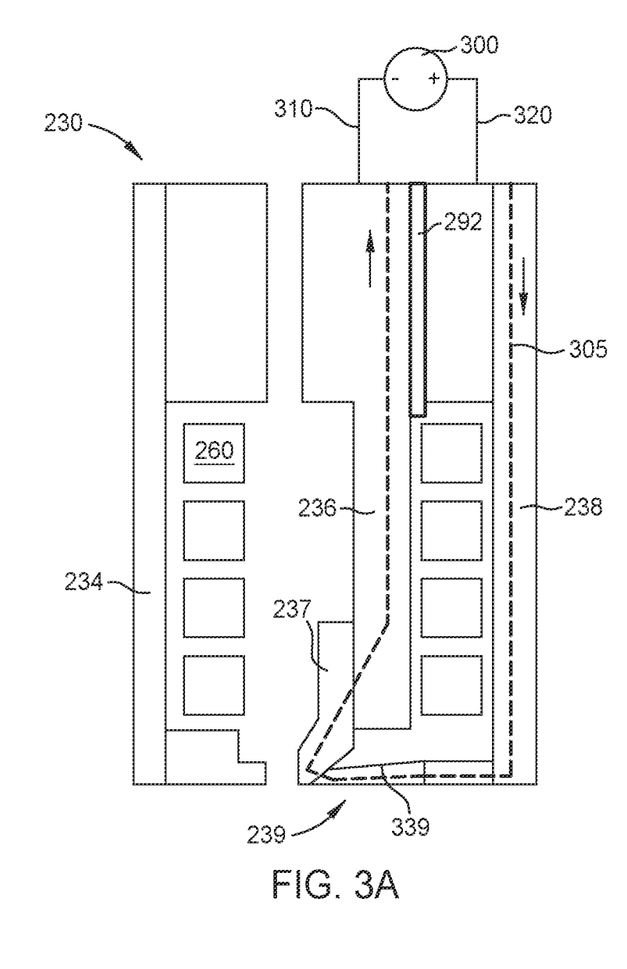
FIG. 3A is a schematic illustration of certain embodiments of a cross sectional side view of a HAMR write head with two terminals for a current path through a trailing gap between the main pole and the trailing shield.

FIG. 3A is a schematic illustration of certain embodiments of a cross sectional side view of a HAMR write head 230 with two terminals for a current path 305 through a trailing gap 239 between the main pole 236 and the trailing shield 238. The HAMR write head 230 may correspond to the HAMR write head 230 described in FIG. 2 and like numerals have been used for ease of description. In other embodiments, the HAMR write head 230 corresponds to a recording head used in other magnetic media drives. The HAMR write head 230 of FIG. 3A includes a waveguide, a light source, and an NFT which are not shown for ease of description.

The HAMR write head 230 comprises a first terminal 310 coupled to the main pole 236 and a second terminal 320 coupled to the trailing shield 238. A power source 300 is coupled to the first terminal 310 and the second terminal 320. The main pole 236 is separated from the trailing shield 238 by an electrically insulating layer 292. A trailing gap electrical connection 339 is disposed in the trailing gap 239 and electrically couples the trailing shield 238 and the main pole 236.

The first terminal 310 coupled to the main pole 236 and the second terminal 320 coupled to the trailing shield 238 form a current path 305 through the trailing shield 238, the trailing gap electrical connection 339, and through the main pole 236. A bias current applied by the power source 300 to the current path 305 creates an assisting magnetic field emanating from the current path, such as at least partially from the trailing gap electrical connection 339. Although FIG. 3A shows the current flow from the trailing shield 238 to the trailing gap electrical connection 339, the current flow direction can be reversed by reversing the polarities of the power source 300 to provide a current flow from the main pole 236 to the trailing gap electrical connection 339. The assisting magnetic field reduces the sector error rate of recording data to a magnetic disk or magnetic media. In certain embodiments, sector error rate improves with increased bias current through the current path 305. In certain aspects, the amount of bias current through the current path 305 is limited by the amount of joule heating caused by the bias current which could reduce the lifetime of the HAMR write head 230. The assistive effect from the bias current is further described in U.S. patent application Ser. No. 16/277,953 filed on Feb. 15, 2019 entitled CURRENT-ASSISTED MAGNETIC RECORDING WRITE HEAD WITH IMPROVED WRITE GAP STRUCTURE", now U.S. Pat. No. 10,679,650, which is incorporated by reference in its entirety.

Figure 3B:
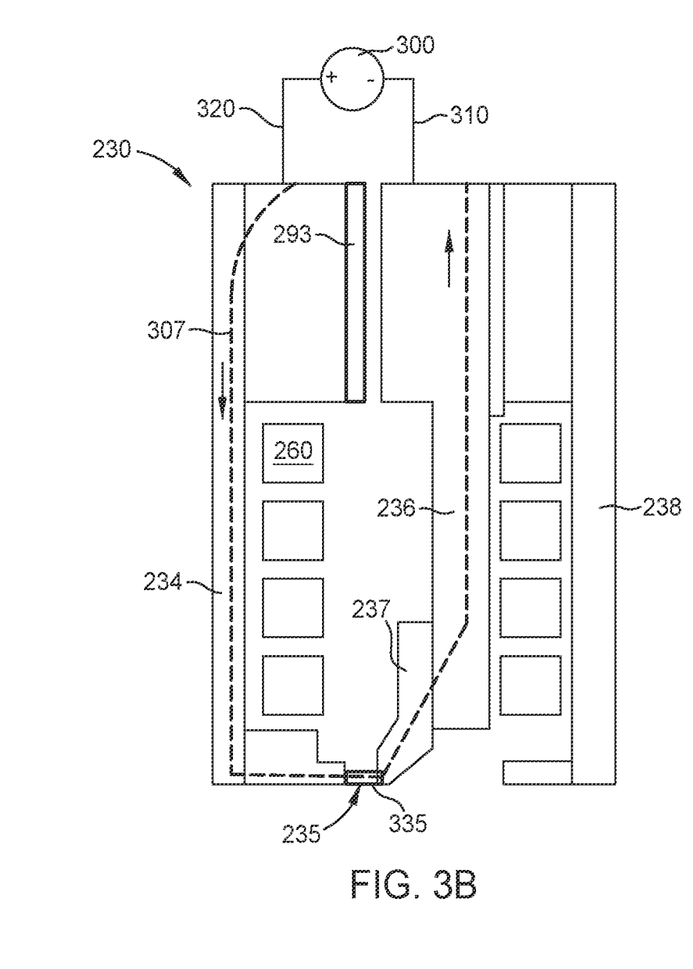
FIG. 3B is a schematic illustration of certain embodiments of a cross sectional side view of a HAMR write head with two terminals for a current path through a leading gap between the main pole and the leading shield.

FIG. 3B is a schematic illustration of certain embodiments of a cross sectional side view of a HAMR write head 230 with two terminals for a current path 307 through a leading gap 235 between the main pole 236 and the leading shield 234. The HAMR write head 230 may correspond to the HAMR write head 230 described in FIG. 2 and like numerals have been used for ease of description. In other embodiments, the HAMR write head 230 corresponds to a recording head used in other magnetic media drives. The HAMR write head 230 of FIG. 3B includes a waveguide, a light source, and an NFT which are not shown for ease of description.

The HAMR write head 230 comprises a first terminal 310 coupled to the main pole 236 and a second terminal 320 coupled to the leading shield 234. A power source 300 is coupled to the first terminal 310 and the second terminal 320. The main pole 236 is separated from the leading shield 234 by an electrically insulating layer 293. A leading gap electrical connection 335 is disposed in the leading gap 235 and electrically couples the leading shield 234 and the main pole 236.

The first terminal 310 coupled to the main pole 236 and the second terminal 320 coupled to the leading shield 234 form a current path 307 through the leading shield 234, the leading gap electrical connection 335, and through the main pole 236. A bias current applied by the power source 300 to the current path 307 creates an assisting magnetic field emanating from the current path, such as at least from the leading gap electrical connection 335. Although FIG. 3B shows the current flow from the leading shield 234 to the leading gap electrical connection 335, the current flow direction can be reversed by reversing the polarities of the power source 300 to provide a current flow from the main pole 236 to the leading gap electrical connection 335. In certain embodiments, sector error rate improves with increased bias current through the current path 307. In certain aspects, the amount of bias current through the current path 307 is limited by the amount of joule heating caused by the bias current which could reduce the lifetime of the HAMR write head 230.

Figure 4A:
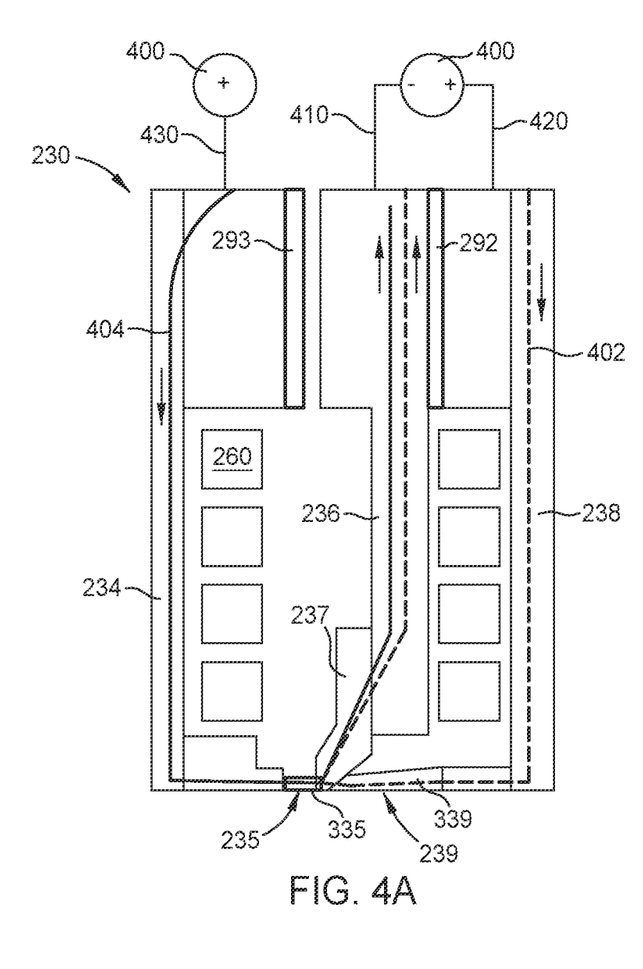
FIG. 4A is a schematic illustration of certain embodiments of a cross sectional side view of a HAMR write head with three terminals with different current paths through a trailing gap or through a leading gap.

FIG. 4A is a schematic illustration of certain embodiments of a cross sectional side view of a HAMR write head 230 with three terminals with different current paths through a trailing gap 239 or through a leading gap 235. The HAMR write head 230 may correspond to the HAMR write head 230 described in FIG. 2 and like numerals have been used for ease of description. In other embodiments, the HAMR write head 230 corresponds to a recording head used in other magnetic media drives. The HAMR write head 230 of FIG. 4A includes a waveguide, a light source, and an NFT which are not shown for ease of description.

As shown in FIG. 4A, the main pole 236 is a common electrode. The HAMR write head 230 comprises a first terminal 410 coupled to the main pole 236, a second terminal 420 coupled to the trailing shield 238, and a third terminal 430 coupled to the leading shield 234. A power source 400 is coupled to the first terminal 410, the second terminal 420, and the third terminal 430. The main pole 236 is separated from the trailing shield 238 by an electrically insulating layer 292 and is separated from the leading shield 234 by an electrically insulating layer 293. A trailing gap electrical connection 339 is disposed in the trailing gap 239 and electrically couples the trailing shield 238 and the main pole 236. A leading gap electrical connection 335 is disposed in the leading gap 235 and electrically couples the leading shield 234 and the main pole 236.

The first terminal 410 coupled to the main pole 236 and the second terminal 420 coupled to the trailing shield 238 form a first current path 402 through the trailing shield 238, trailing gap electrical connection 339, and the main pole 236. A first bias current applied by the power source 400 to the first current path 402 creates a first assisting magnetic field emanating from the current path, such as at least partially from the trailing gap electrical connection 339. Although FIG. 4A shows the current flow from the trailing shield 238 to the trailing gap electrical connection 339, the current flow direction can be reversed by reversing the polarities of the power source 400 to provide a current flow from the main pole 236 to the trailing gap electrical connection 339.

The first terminal 410 coupled to the main pole 236 and the third terminal 430 coupled to the leading shield 234 form a second current path 404 through the leading shield 234, the leading gap electrical connection 335, and through the main pole 236. A second bias current applied by the power source 400 to the second current path 404 creates a second assisting magnetic field emanating from the current path, such as at least from the leading gap electrical connection 335. Although FIG. 4A shows the current flow from the leading shield 234 to the leading gap electrical connection 335, the current flow direction can be reversed by reversing the polarities of the power source 400 to provide a current flow from the main pole 236 to the leading gap electrical connection 335.

A first bias current through the first current path 402 and the second bias current through the second current path 404 can each be independently controlled to provide the first assisting magnetic field and the second assisting magnetic field. For example, a first bias current through the first current path 402 may be set to any desired level to provide a first assisting magnetic field, and a second bias current through the second current path 404 may be set to any desired level to provide a second assisting magnetic field. In certain embodiments, the first bias current and the second bias current can be independently controlled to control the undesirable joule heating of various parts of the HAMR write head 230 caused by the bias currents.

Figure 4B:
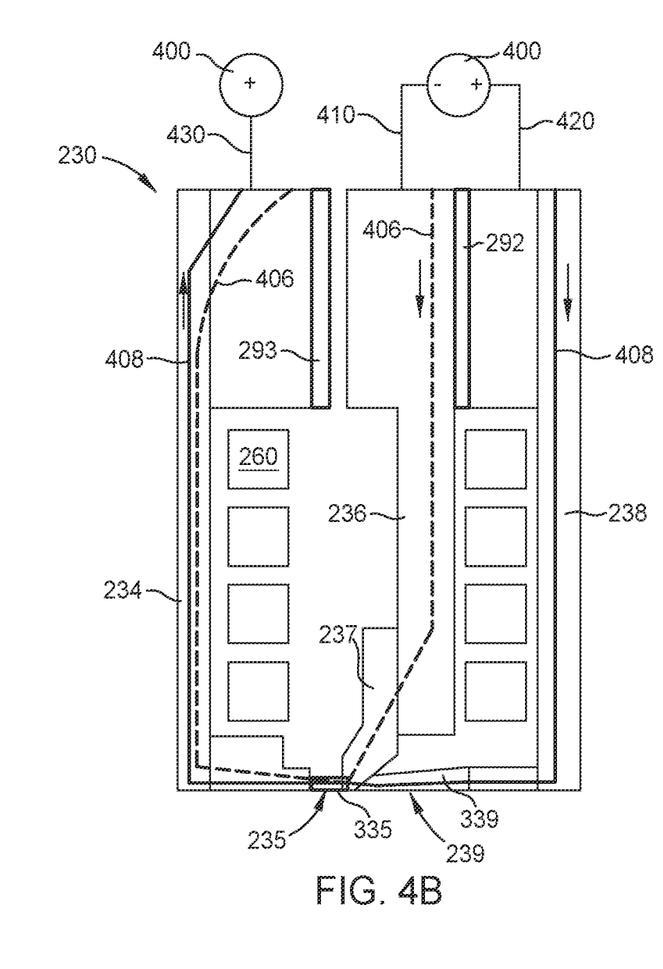
FIG. 4B is a schematic illustration of certain embodiments of a cross sectional side view of a HAMR write head with three terminals with different current paths through a trailing gap and/or a leading gap.

FIG. 4B is a schematic illustration of certain embodiments of a cross sectional side view of a HAMR write head 230 with three terminals with different current paths through a trailing gap 239 and/or a leading gap 235. The HAMR write head 230 may correspond to the HAMR write head 230 described in FIG. 2 and like numerals have been used for ease of description. In other embodiments, the HAMR write head 230 corresponds to a recording head used in other magnetic media drives. The HAMR write head 230 of FIG. 4B includes a waveguide, a light source, and an NFT which are not shown for ease of description.

As shown in FIG. 4B, the leading shield 234 is a common electrode. The HAMR write head 230 comprises a first terminal 410 coupled to the main pole 236, a second terminal 420 coupled to the trailing shield 238, and a third terminal 430 coupled to the leading shield 234. A power source 400 is coupled to the first terminal 410, the second terminal 420, and the third terminal 430. The main pole 236 is separated from the trailing shield 238 by an electrically insulating layer 292 and is separated from the leading shield 234 by an electrically insulating layer 293. A trailing gap electrical connection 339 is disposed in the trailing gap 239 and electrically couples the trailing shield 238 and the main pole 236. A leading gap electrical connection 335 is disposed in the leading gap 235 and electrically couples the leading shield 234 and the main pole 236.

The first terminal 410 coupled to the main pole 236 and the third terminal 430 coupled to the trailing shield 238 form a first current path 406 through the main pole 236, the leading gap electrical connection 335, and the leading shield 234. A first bias current applied by the power source 400 to the first current path 406 creates a first assisting magnetic field emanating from the current path, such as at least partially from the leading gap electrical connection 335. Although FIG. 4B shows the current flow from the main pole 236 to the leading gap electrical connection 335, the current flow direction can be reversed by reversing the polarities of the power source 400 to provide a current flow from the leading shield 234 to the leading gap electrical connection 335.

The second terminal 420 coupled to the trailing shield 238 and the third terminal 430 coupled to the leading shield 234 form a second current path 408 through the trailing shield 238, the trailing gap electrical connection 339, the main pole tip 237, the leading gap electrical connection 335, and the leading shield 234. A second bias current applied by the power source 400 to the second current path 408 creates a second assisting magnetic field emanating from the current path, such as at least from the trailing gap electrical connection 339 and the leading gap electrical connection 335. Although FIG. 4B shows the current flow from the trailing shield 238 to the trailing gap electrical connection 339 and the leading gap electrical connection 335, the current flow direction can be reversed by reversing the polarities of the power source 400 to provide a current flow from the leading shield 234 to the leading gap electrical connection 335 and the trailing gap electrical connection 339.

A first bias current through the first current path 406 and the second bias current through the second current path 408 can each be independently controlled to provide the first assisting magnetic field and the second assisting magnetic field. For example, a first bias current through the first current path 406 may be set to any desired level to provide a first assisting magnetic field, and a second bias current through the second current path 408 may be set to any desired level to provide a second assisting magnetic field. In certain embodiments, the first bias current and the second bias current can be independently controlled to control the undesirable joule heating of various parts of the HAMR write head 230 caused by the bias currents.

Figure 5:
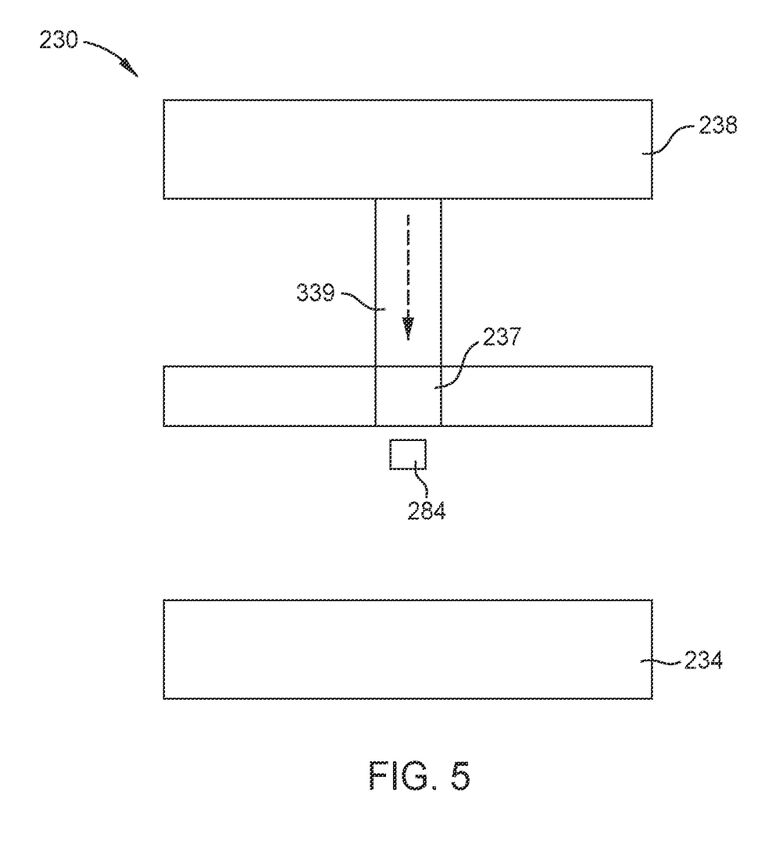
FIG. 5 is a schematic illustration of certain embodiments of an MFS view of a HAMR write head with a trailing gap electrical connection.

FIG. 5 is a schematic illustration of certain embodiments of an MFS view of a HAMR write head 230 with a trailing gap electrical connection 339. The HAMR write head 230 may correspond to the HAMR write head 230 with a trailing gap electrical connection 339 described in FIG. 2, 3A, or 4A-B and like numerals have been used for ease of description. The trailing gap electrical connection 339 can contact the trailing shield 238 and the main pole tip 237 of the main pole.

Figure 6A:
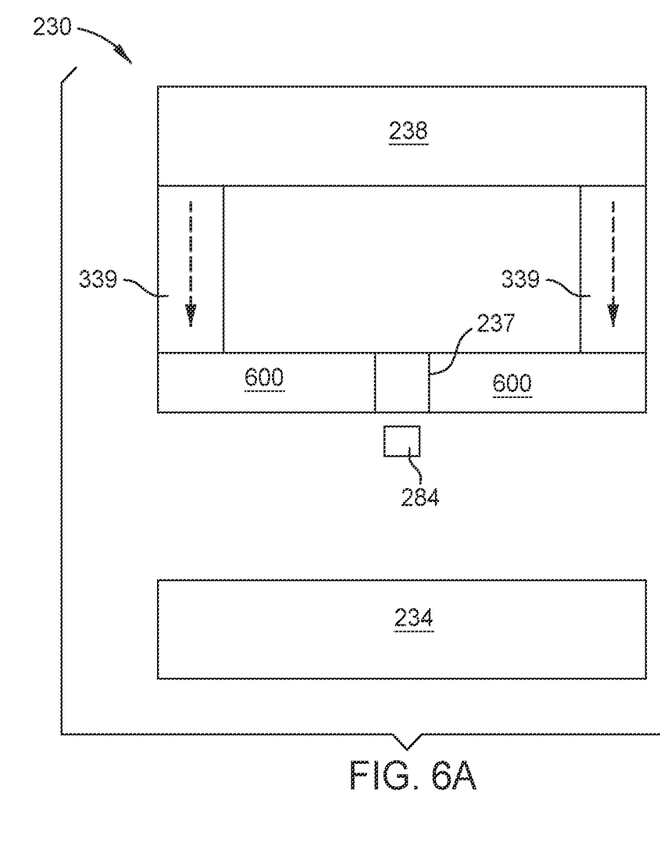
FIG. 6A is a schematic illustration of certain embodiments of an MFS view of a HAMR write head with one or more trailing gap electrical connections.

FIG. 6A is a schematic illustration of certain embodiments of an MFS view of a HAMR write head 230 with one or more trailing gap electrical connections 339. The HAMR write head 230 may correspond to the HAMR write head 230 with one or more trailing gap electrical connections 339 described in FIG. 2, 3A, or 4A-B and like numerals have been used for ease of description. A trailing gap electrical connection 339 can contact the trailing shield 238 and an electrically conductive element 600 in contact with the main pole tip 237.

Figure 6B:
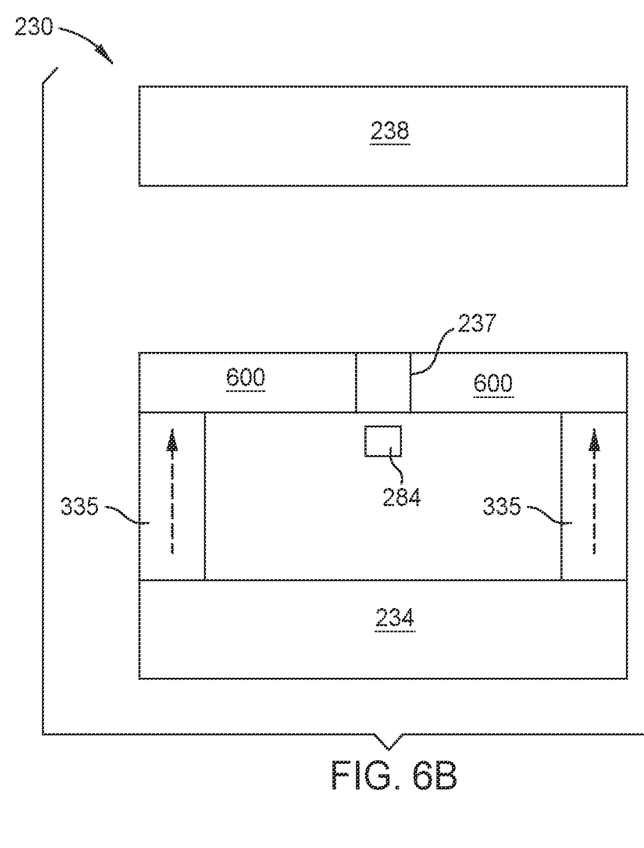
FIG. 6B is a schematic illustration of certain embodiments of an MFS view of a HAMR write head with one or more leading gap electrical connections.

FIG. 6B is a schematic illustration of certain embodiments of an MFS view of a HAMR write head 230 with one or more leading gap electrical connections 335. The HAMR write head 230 may correspond to the HAMR write head 230 with one or more leading gap electrical connections 335 described in FIGS. 2, 3B, 4A-B and like numerals have been used for ease of description. A leading gap electrical connection 335 can contact the leading shield 234 and an electrically conductive element 600 in contact with the main pole tip 237. The leading gap electrical connection 335 are laterally spaced away from the NFT 284 in a cross-track direction to avoid interfering with the NFT 284 or other optical elements of the HAMR write head 230.

Figure 7A:
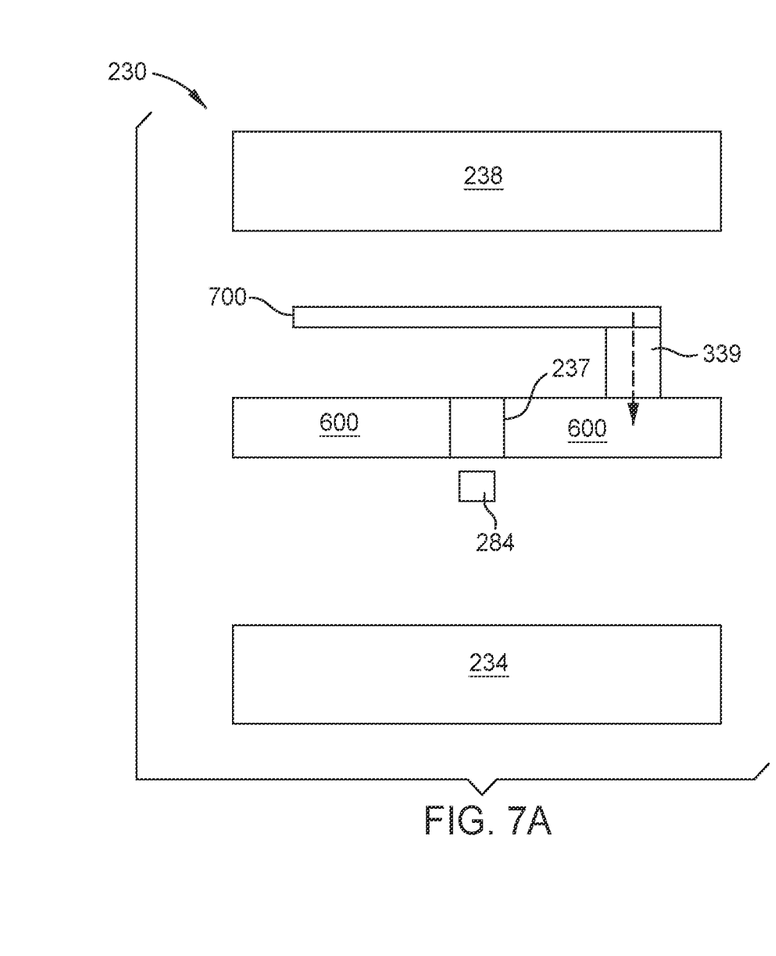
FIG. 7A is a schematic illustration of certain embodiments of an MFS view of a HAMR write head with a near-field temperature sensor (NTS) between a main pole and a trailing shield.

FIG. 7A is a schematic illustration of certain embodiments of an MFS view of a HAMR write head 230 with a near-field temperature sensor (NTS) 700 between the main pole and the trailing shield 238. The HAMR write head 230 may correspond to the HAMR write head 230 with one or more trailing gap electrical connections 339 described in FIG. 2, 3A, or 4A-B and like numerals have been used for ease of description. A trailing gap electrical connection 339 can electrically couple the NTS 700 and the main pole. As shown, the trailing gap electrical connection 339 can contact a NTS 700 and an electrically conductive element 600 in contact with the main pole. In other embodiments, the NTS 700 can be electrically coupled to the trailing shield 238 or can be electrically coupled to the power source 300 (not shown) to form a current path 305, 402, 408 through the trailing gap electrical connection 339. The NTS 700 senses the optical power in the waveguide or the temperature of the NTF to determine whether the light source 278 (FIG. 2) is functioning properly. It is believed that a single current path through the NTS 700 provides reduced signal noise of the NTS in comparison to multiple current paths through the NTS 700.

Figure 7B:
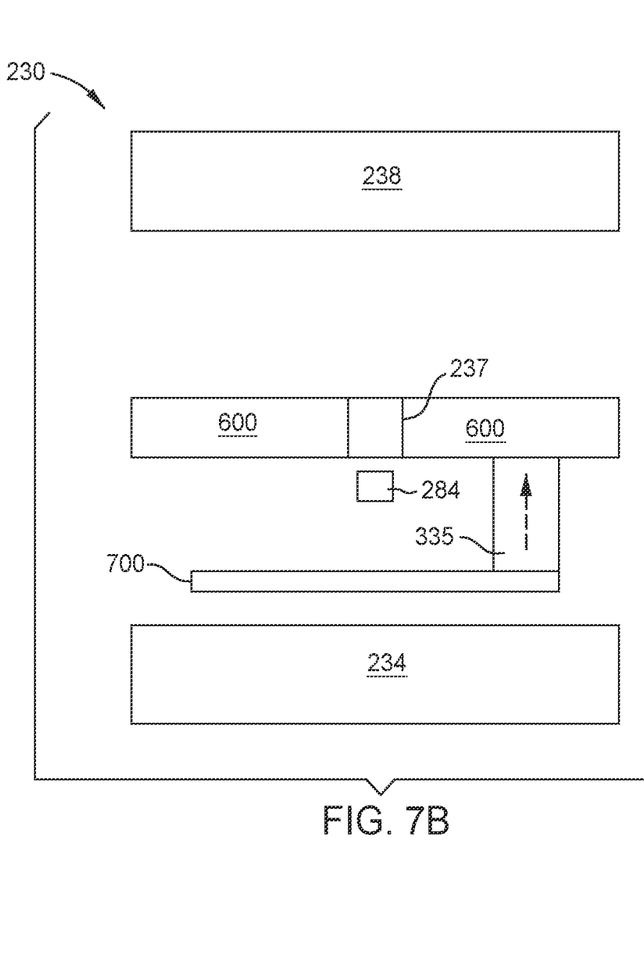
FIG. 7B is a schematic illustration of certain embodiments of an MFS view of a HAMR write head with a near-field temperature sensor (NTS) between s main pole and a leading shield.

FIG. 7B is a schematic illustration of certain embodiments of an MFS view of a HAMR write head 230 with a near-field temperature sensor (NTS) 700 between the main pole and the leading shield 234. The HAMR write head 230 may correspond to the HAMR write head 230 with one or more leading gap electrical connections 335 described in FIG. 2, 3B, or 4A-B and like numerals have been used for ease of description. A leading gap electrical connection 335 can electrically couple the NTS 700 and the main pole. The leading gap electrical connection 335 are laterally spaced away from the NFT 284 in a cross-track direction to avoid interfering with the NFT 284 or other optical elements of the HAMR write head 230. In other embodiments (not shown), the NTS 700 can be electrically coupled to the leading shield 234 or coupled to the power source 300 to form a current path 307, 404, 406, 408 through the leading gap electrical connection 335. The NTS 700 senses the optical power in the waveguide or the temperature of the NTF to determine whether the light source 278 is functioning properly. It is believed that a single current path through the NTS 700 provides reduced signal noise of the NTS in comparison to multiple current paths through the NTS 700.

The main pole tip 237 at a MFS as shown in FIGS. 5, 6A-B, 7A-B may be any suitable shape (e.g., trapezoidal, triangular, etc.) and any suitable dimensions.

The one or more trailing gap electrical connections 339 and the one or more leading gap electrical connections 335 of FIGS. 3A-B, 4A-B, 5, 6A-B, 7A-B can each independently be any suitable shape and any suitable dimensions. The one or more trailing gap electrical connections 339 and the one or more leading gap electrical connections 335 can each independently be any non-magnetic electrically conductive materials, such as Au, Ag, Pt, Ta, Ir, Al, Si, Ge, Ti, Cu, Pd, Ru, Mo, W, other non-magnetic metals, alloys thereof, electrically conductive non-metals, and multiple layers.

In certain embodiments, an electrically conductive element 600 of FIGS. 6A-6B, 7A-7B can be a heat sink for dissipating heat generated from the NFT 284, heat generated from joule heating of one or more current paths through the one or more trailing gap electrical connections 339, and/or heat generated from other sources. In certain embodiments, an electrically conductive element 600 of FIGS. 6A-6B, 7A-7B can be a touchdown pad which senses when the HAMR write head 230 undesirably makes touchdown to the magnetic disk 112 or magnetic media. In certain embodiments, an electrically conductive element 600 of FIGS. 6A-6B, 7A-7B can be a diffusion barrier layer which limits or prevents the diffusion of material from the main pole tip 237 to the NFT 284 and/or waveguide. Without a diffusion barrier layer, the high temperature of the NFT 284 during operation may undesirably cause diffusion of material from the main pole tip 237 to the NFT 284 which may alter the optical properties of the NFT 284 and/or the waveguide. The one or more electrically conductive elements 600 of FIGS. 6A-6B, 7A-7B can comprise a single layer or multiple layers of a non-magnetic electrically conductive material, such as Au, Cu, Al, Ag, or combinations thereof. The one or more electrically conductive elements can be a rectangular shape as shown or can be any suitable shape. In certain embodiments, the electrically conductive elements 600 can partially or fully surround the main pole tip 237. In certain embodiments, the electrically conductive elements 600 can extend to the MFS (as shown) or be recessed from the MFS.

The power source 300 of FIGS. 3A-B, 4A-B, 5, 6A-B, 7A-B can provide any suitable waveform to the current paths 305, 307, 402, 404, 406, 408. For example, the waveform can be a constant direct current waveform, pulsed direct current waveforms, pulsed current waveforms, other suitable waveforms, or combinations thereof.

The HAMR write heads 230 of FIGS. 2, 3A-B, 4A-B, 5, 6A-B, 7A-B include both a leading shield 234 and a trailing shield 238. In other embodiments (not shown), the trailing shield 238 may be omitted in which the leading shield 234 acts as the sole return pole of the main pole 236. In other embodiments (not shown), the leading shield 234 may be omitted in which the trailing shield 238 acts as the sole return pole of the main pole 236.

In HAMR writer heads, a significant flux jitter or noise is present across main pole transitions caused by chaotic switching of magnetic domains in the main pole. Flowing current proximate the MFS of the HAMR write heads can produce an assisting magnetic field which reduces the noise along the main pole magnetization transitions. The current can be flowed through one or more current paths provided through the main pole tip. Terminals of the one or more current paths can be coupled to the main pole, a trailing shield, a leading shield, a heat sink layer, a touch pad, a pole diffusion barrier layer, a NTS sensor, or another suitable component of the HAMR write head. For example, electrical connections across the trailing gap and/or leading gap can be made to the main pole tip or to components in contact with the main pole tip to avoid interference with the NFT.

One or more bias current provided to the one or more current paths creates one or more assisting magnetic fields at least partially from a trailing gap electrical connection and/or at least partially from a leading gap electrical connection. If multiple current paths are formed through the HAMR write head, the same or different waveforms can be applied to the current path. For example, different waveforms can be different bias current levels provided to the multiple current paths. A HAMR write head with assisting magnetic field(s) generated by the one or more current paths and with heat generated by the waveguide can write to a magnetic disk or a magnetic medium with reduced errors.

In one embodiment, a HAMR write head includes a waveguide and a trailing shield. A main pole is between the waveguide and the trailing shield. The main pole has a main pole tip. A coil is around the main pole. An electrical connection is between the main pole tip and the trailing shield. A first terminal is coupled to the main pole. A second terminal is coupled to the trailing shield. A current path is formed between the first terminal and the second terminal through the trailing shield, the electrical connection, and the main pole.

In another embodiment, a HAMR write head includes a leading shield and a main pole. The main pole has a main pole tip. A waveguide is between the leading shield and the main pole. A coil is around the main pole. An electrical connection is between the main pole tip and the leading shield. A first terminal is coupled to the main pole. A second terminal is coupled to the leading shield. A current path is formed between the first terminal and the second terminal through the leading shield, the electrical connection, and the main pole.

In still another embodiment, a HAMR write head includes a leading shield and a trailing shield. A main pole is between the leading shield and the trailing shield. The main pole has a main pole tip. A waveguide is between the leading shield and the main pole. A coil is around the main pole. A leading gap electrical connection is between the main pole tip and the leading shield. A trailing gap electrical connection is between the main pole tip and the trailing shield. A first terminal coupled to the main pole. A second terminal is coupled to the trailing shield. A third terminal is coupled to the leading shield. A first current path is formed through the trailing gap electrical connection. A second current path is formed through the leading gap electrical connection.

While the foregoing is directed to embodiments of the present disclosure, other and further embodiments of the disclosure may be devised without departing from the basic scope thereof, and the scope thereof is determined by the claims that follow.

What is claimed is:
1. A heat-assisted magnetic recording (HAMR) write head, comprising:
a waveguide;
a trailing shield;
a main pole between the waveguide and the trailing shield, the main pole having a main pole tip;
a coil around the main pole;
an electrical connection between the main pole tip and the trailing shield;
a first terminal coupled to the main pole;
a second terminal coupled to the trailing shield; and
a current path formed between the first terminal and the second terminal through the trailing shield, the electrical connection, and the main pole.

2. The HAMR write head of claim 1, wherein the electrical connection contacts the main pole tip and the trailing shield.

3. The HAMR write head of claim 1, wherein the electrical connection is coupled to the main pole tip through one or more electrically conductive elements selected from a group consisting of a heat sink, a touch pad, a pole diffusion barrier layer, and combinations thereof.

4. The HAMR write head of claim 1, wherein the electrical connection is coupled to the main pole tip through a near-field temperature sensor.

5. A magnetic media drive comprising the HAMR write head of claim 1.

6. A heat-assisted magnetic recording (HAMR) write head, comprising:
a leading shield;
a main pole, the main pole having a main pole tip;
a waveguide between the leading shield and the main pole;
a coil around the main pole;
an electrical connection between the main pole tip and the leading shield;
a first terminal coupled to the main pole;
a second terminal coupled to the leading shield; and
a current path formed between the first terminal and the second terminal through the leading shield, the electrical connection, and the main pole.

7. The HAMR write head of claim 6, further comprising a near-field transducer at one end of the waveguide proximate to the main pole tip, wherein the electrical connection is laterally spaced away from the near-field transducer.

8. The HAMR write head of claim 7, wherein the electrical connection is coupled to the main pole tip through one or more electrically conductive elements selected from a group consisting of a heat sink, a touch pad, a pole diffusion barrier layer, and combinations thereof.

9. The HAMR write head of claim 8, wherein the electrical connection is coupled to a near-field temperature sensor.

10. A magnetic media drive comprising the HAMR write head of claim 6.

11. A heat-assisted magnetic recording (HAMR) write head, comprising:
a leading shield and a trailing shield;
a main pole between the leading shield and the trailing shield, the main pole having a main pole tip;
a waveguide between the leading shield and the main pole;
a coil around the main pole;
a leading gap electrical connection between the main pole tip and the leading shield;
a trailing gap electrical connection between the main pole tip and the trailing shield;
a first terminal coupled to the main pole;
a second terminal coupled to the trailing shield;
a third terminal coupled to the leading shield;

a first current path through the trailing gap electrical connection; and a second current path through the leading gap electrical connection.

12. The HAMR write head of claim 11, wherein the main pole is a common electrode of the first current path the second current path.

13. The HAMR write head of claim 12, wherein the first current path is formed between the first terminal and the second terminal through the trailing shield, the trailing gap electrical connection, and the main pole; and wherein the second current path is formed between the first terminal and the third terminal through the leading shield, the leading gap electrical connection, and the main pole.

14. The HAMR write head of claim 11, wherein the leading shield is a common electrode of the first current path the second current path.

15. The HAMR write head of claim 14, wherein the first current path is formed between the first terminal and the third terminal through the main pole, the leading gap electrical connection, and the leading shield; and wherein the second current path formed between the second terminal and the third terminal through the trailing shield, the trailing gap electrical connection, the main pole tip, the leading gap electrical connection, and the leading shield.

16. The HAMR write head of claim 11, wherein the trailing gap electrical connection contacts the main pole tip and the trailing shield.

17. The HAMR write head of claim 11, wherein the trailing gap electrical connection is coupled to the main pole tip through one or more electrically conductive elements selected from a group consisting of a heat sink, a touch pad, a pole diffusion barrier layer, and combinations thereof.

18. The HAMR write head of claim 11, further comprising a near-field transducer at one end of the waveguide proximate to the main pole tip, wherein the leading gap electrical connection is laterally spaced away from the near-field transducer.

19. The HAMR write head of claim 18, wherein the leading gap electrical connection is coupled to the main pole tip through one or more electrically conductive elements selected from a group consisting of a heat sink, a touch pad, a pole diffusion barrier layer, and combinations thereof.

20. A magnetic media drive comprising the HAMR write head of claim 11.

* * * * *